(12) United States Patent
Pavagada Visweswara et al.

(10) Patent No.: US 12,443,444 B2
(45) Date of Patent: Oct. 14, 2025

(54) METHOD AND SYSTEM FOR PREDICTING AND OPTIMIZING RESOURCE UTILIZATION OF AI APPLICATIONS IN AN EMBEDDED COMPUTING SYSTEM

(71) Applicant: SAMSUNG ELECTRONICS CO., LTD., Suwon-si (KR)

(72) Inventors: Ashutosh Pavagada Visweswara, Karnataka (IN); Pallavi Thummala, Karnataka (IN); Chirag Girdhar, Karnataka (IN); Alladi Ashok Kumar Senapati, Karnataka (IN); Pradeep N S Nelahonne Shivamurthappa, Karnataka (IN); Venkappa Mala, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 17/453,945

(22) Filed: Nov. 8, 2021

(65) Prior Publication Data

US 2022/0066829 A1    Mar. 3, 2022

Related U.S. Application Data

(63) Continuation of application No. PCT/KR2020/006330, filed on May 14, 2020.

(30) Foreign Application Priority Data

May 14, 2019  (IN) .............................. 201941019136
May 12, 2020  (IN) .............................. 201941019136

(51) Int. Cl.
*G06F 9/46*    (2006.01)
*G06F 9/445*   (2018.01)
*G06F 9/50*    (2006.01)

(52) U.S. Cl.
CPC ........ *G06F 9/5016* (2013.01); *G06F 9/44505* (2013.01); *G06F 9/5033* (2013.01); *G06F 9/5038* (2013.01)

(58) Field of Classification Search
None
See application file for complete search history.

(56) References Cited

U.S. PATENT DOCUMENTS 7,484,220 B2    1/2009  Kelley et al.
8,209,275 B2    6/2012  Tsui et al.
(Continued)

FOREIGN PATENT DOCUMENTS

CN   108701034 A  * 10/2018  ............... G06F 8/61
GB   2499306         8/2013

OTHER PUBLICATIONS

International Search Report and Written Opinion of the ISA for PCT/KR2020/006330 mailed Sep. 1, 2020, 8 pages.

*Primary Examiner* — Diem K Cao
(74) *Attorney, Agent, or Firm* — Nixon & Vanderhye, P.C.

(57) ABSTRACT

Disclosed herein is a method and an optimization unit for optimizing and/or improving efficiency of resource utilization in an embedded computing system executing Artificial Intelligence (AI) applications. The method includes: detecting, by an optimization unit comprising processing circuitry and/or executable program instructions configured in the embedded computing system, a launch of an AI application on the embedded computing system; retrieving a runtime profile corresponding to the AI application, the runtime profile indicating resource requirements for executing the AI application; and configuring a runtime environment of the embedded computing system for the AI application based on the runtime profile corresponding to the AI application.

11 Claims, 6 Drawing Sheets

(56) References Cited

U.S. PATENT DOCUMENTS

| | | |
|---|---|---|
| 10,942,562 B2 | 3/2021 | Qawami et al. |
| 11,009,836 B2 | 5/2021 | Hoffmann et al. |
| 2015/0254108 A1* | 9/2015 | Kurtzman ............. G06F 9/5016 718/104 |
| 2017/0004013 A1 | 1/2017 | Zhang et al. |
| 2017/0185788 A1 | 6/2017 | Qiu et al. |
| 2017/0351546 A1* | 12/2017 | Habak .................... G06F 9/505 |
| 2018/0181441 A1 | 6/2018 | Harris |
| 2018/0321972 A1 | 11/2018 | Lin et al. |
| 2019/0042306 A1 | 2/2019 | Pelt et al. |

* cited by examiner

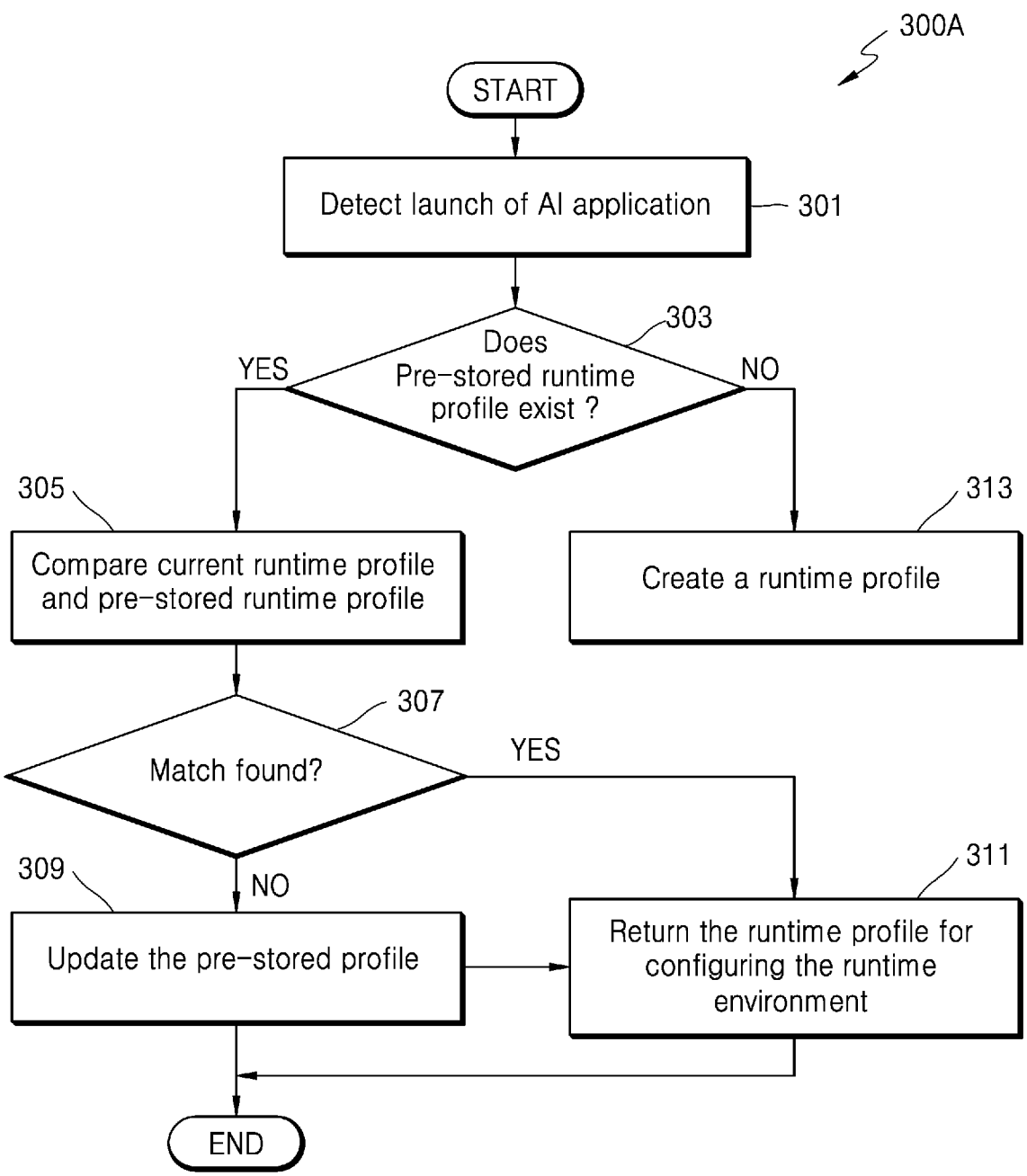

METHOD AND SYSTEM FOR PREDICTING AND OPTIMIZING RESOURCE UTILIZATION OF AI APPLICATIONS IN AN EMBEDDED COMPUTING SYSTEM

CROSS-REFERENCE TO RELATED APPLICATIONS

This application is a continuation of International Application No. PCT/KR2020/006330 designating the United States filed May 14, 2020, in the Korean Intellectual Property Receiving Office and claiming priority to Indian Patent Application number 201941019136 filed May 14, 2019 in the Indian Patent Office and Indian Patent Application number 201941019136 filed May 12, 2020 in the Indian Patent Office, the disclosures of which are incorporated by reference herein in their entireties.

BACKGROUND

Field

The disclosure is related to Artificial Intelligence (AI) and for example, but not exclusively, to a method and system for predicting and optimizing resource utilization in an embedded computing system executing a number of AI applications.

Description of Related Art

It is predicted that the future of on-device application development will be powered by Artificial Intelligence (AI). AI is known to enhance accuracy of application execution, which in turn, enhances personalized user experience with the application. As a result, presently, most of the leading embedded device manufacturers are coming up with various applications powered by AI, which also remain the Unique Selling Proposition (USP) for the products in the market. However, the AI applications come with a cost as they perform extensive computations and require large amount of device's resources such as memory, battery power, computing power, Graphics Processing Units (GPUs), Network Processors (NPUs) and the like.

One such example of extensive usage of the AI applications may be seen around the camera of the mobile devices. When the camera is launched, at least 3 neural network models, such as intelligent camera, automated scene detection, scene optimization and the like, get loaded on to a shared memory space of the mobile device. Hence, the launch of the camera app may take up considerable additional time to open the shutter, which in turn, causes a very bad user experience. Also, the user may experience sluggishness while switching between different modes of the camera application. Therefore, reducing the response time of the AI applications has become a critical concern.

Additionally, the frequent loading or unloading of hardware and software resources from switching between the AI applications has a negative impact on battery consumption of the devices, and inefficient and low Random-Access Memory (RAM) usage. For example, in a mobile device, a rear-camera picture mode may run four neural network models accelerated by a Digital Signal Processor (DSP) or the GPU of the mobile device. Similarly, the front-camera, in a selfie-focus mode may run three Deep Neural Network (DNN) models using the NPU and the CPU of the mobile device. So, while switching from the front camera mode to the rear-camera mode, the NPU models have to unload and the NPU driver has to shut down. Concurrently, the GPU and DSP models have to get loaded from a physical memory and the DNN model execution has to be started. And the above switch-over between the resources takes place each time there is transition from the front-camera mode to the rear-camera mode and vice-versa. This results in redundant calls to wake up the necessary computing units and loading of the necessary model files, causing additional burden on the memory and computing resources of the mobile device.

Hence, there is a need to efficiently and intelligently manage the AI applications to make the devices more responsive, power efficient and optimal in terms of memory usage. This is also desirable for achieving a sustained performance and enhancing the overall user experience with the devices.

The above information is presented as background information only to assist with an understanding of the disclosure. No determination has been made, and no assertion is made, as to whether any of the above might be applicable as prior art with regard to the disclosure.

SUMMARY

The disclosure at least the above-mentioned problems and/or disadvantages and may provide at least the advantages described below.

Embodiments of the disclosure provide a method and a system for predicting and optimizing resource utilization of AI applications in an embedded computing system.

Accordingly, example embodiments herein disclose a method of improving efficiency of resource utilization in an embedded computing system executing Artificial Intelligence (AI) applications. The method comprises: detecting, by an optimization unit comprising processing circuitry and/or executable instructions configured in the embedded computing system, a launch of an AI application on the embedded computing system; retrieving a runtime profile corresponding to the AI application, the runtime profile indicating resource requirements for executing the AI application; and configuring a runtime environment of the embedded computing system for the AI application based on the runtime profile corresponding to the AI application.

Accordingly, example embodiments herein disclose an optimization unit configured to improve efficiency of resource utilization in an embedded computing system executing Artificial Intelligence (AI) applications. The optimization unit comprises: a processor and a memory, the memory being communicatively coupled to the processor and storing processor-executable instructions, which on execution, cause the processor to: detect a launch of an AI application on the embedded computing system; retrieve a runtime profile corresponding to the AI application, the runtime profile indicating resource requirements for executing the AI application; and configure a runtime environment of the embedded computing system for the AI application based on the runtime profile corresponding to the AI application.

In various example embodiments, the method of the disclosure aids in optimizing and/or making more efficient resource utilization in an embedded computing system executing a plurality of Artificial Intelligence (AI) based applications.

In various example embodiments, the method of the disclosure dynamically configures a runtime environment of the embedded computing system with adequate resources required for running an AI application, and thereby enhances personalized user experience.

In various example embodiments, the method of the disclosure manages the allocation and de-allocation of the resources to the concurrently running AI applications to ensure optimal and/or efficient usage of the resources and reduces additional burden on memory and computing units of the embedded computing system.

In various example embodiments, the method of the disclosure optimizes and/or makes more efficient the power consumption in the embedded computing system by eliminating redundant memory/resource load and unload operations during execution of the AI applications.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3A is a flowchart illustrating an example method of creating and updating runtime profile for an AI application according to various embodiments;

Figure 1:
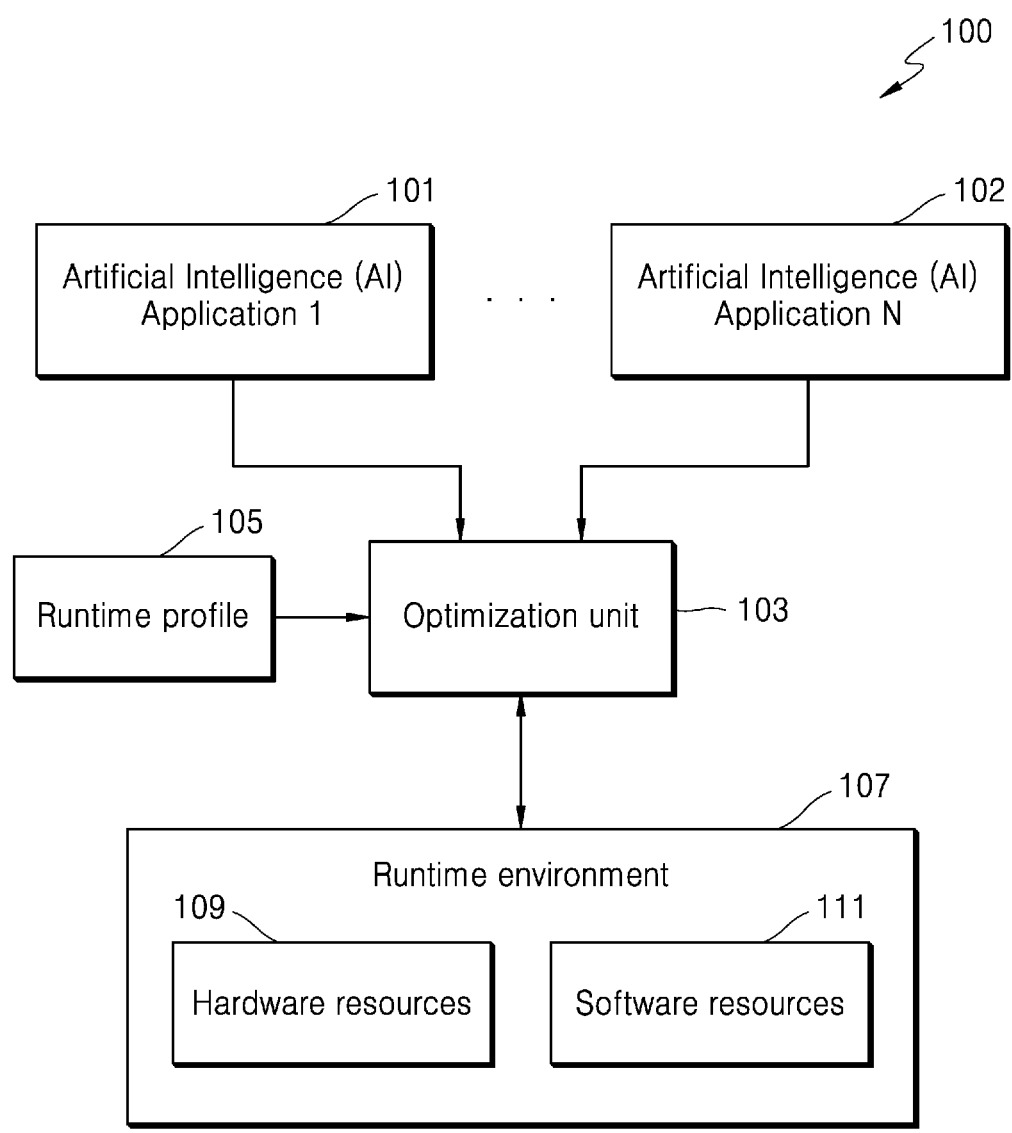
FIG. 1 is a diagram illustrating an example architecture illustrating optimization of resource utilization in an embedded computing system in according to various embodiments.

It should be appreciated by those skilled in the art that any block diagrams herein represent conceptual views of illustrative systems embodying various examples of the subject matter of the disclosure. Similarly, it will be appreciated that any flow charts, flow diagrams, state transition diagrams, pseudo code, and the like represent various example processes which may be substantially represented in computer readable medium and executed by a computer or processor, whether such computer or processor is explicitly shown.

DETAILED DESCRIPTION

In the disclosure, the word "exemplary" or "example" is used herein to mean "serving as an example, instance, or illustration." Any embodiment or implementation of the disclosure described herein as "exemplary" is not necessarily to be construed as preferred or advantageous over other embodiments.

While the disclosure is susceptible to various modifications and alternative forms, various example embodiments thereof have been shown by way of example in the drawings and will be described in greater detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The disclosure is related to a method of optimizing resource utilization in an embedded computing system executing AI applications. The disclosure discloses a versatile Neural Lookahead Framework (NLF), designed for applications that use a Machine Learning (ML) model on the embedded computing devices. In an embodiment, the NLF, may also be referred to as an optimization unit, and may act as an intermediary between the AI applications and an ML inference engine configured on the embedded computing devices to enhance the performance of the AI applications. In other words, the NLF/optimization unit may be used to efficiently set the runtime environment for the execution of AI applications using an AI predictor, which may predict the AI application's resource requirements based on inputs such as, for example, and without limitation, performance sensor data, performance mode, RAM availability, battery availability, next predicted applications and the like. Further, the resource requirements information may be stored in the form of runtime profiles, and may be continuously updated based on updated resource requirements of the applications. During real-time execution of the AI applications, the optimization unit may analyze current resource requirements for the AI applications based on the runtime profiles and may configure the runtime environment based on the current resource requirements. For example, the optimization unit may employ a resource management method to efficiently utilize the device's resources such as RAM and other computing units (CPU, GPU, DSP and NPU). Further, the optimization unit may categorize the applications into different performance states, based on which a decision is made to either hold or release the resources allocated to the AI applications. Thus, the optimization unit may optimize and/or make more efficient the resource utilization in the embedded computing devices and may also reduce the burden on the memory and computing resources of the devices, thereby enhancing overall user experience.

In the following detailed description, reference is made to the accompanying drawings, and in which are shown by way of illustration various example embodiments. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

FIG. 1 is a diagram illustrating an example architecture illustrating example optimization of resource utilization in an embedded computing system according to various embodiments.

In an embodiment, the environment 100 may represent architecture of an embedded computing system such as a mobile device, a tablet, a camera and the like. In an implementation, the environment 100 may include one or more Artificial Intelligence (AI) applications namely, Artificial Intelligence (AI) application 1 101 to AI application N 102 (collectively referred as an AI application 101 or AI applications 101) running and/or being executed on the embedded computing system. As an example, the AI applications 101 may include, without limiting to, an AI camera application, a scene optimizer application, an AI voice assistant, an AI based measurement application and the like.

In an embodiment, the environment 100 may further include an optimization unit (e.g., including various processing circuitry and/or executable program instructions) 103 and a runtime environment 107 of the embedded computing system.

In an embodiment, the optimization unit 103 may include various processing circuitry and/or executable program instructions and be an AI based computing unit or a neural network based framework configured in the embedded computing system to ensure smooth functioning of the AI applications 101, and concurrently, optimizing resource utilization in the runtime environment 107 of the embedded computing system. In an example implementation, the optimization unit 103 may be integrated within an existing computing unit, such as, for example, and without limitation, a Central Processing Unit (CPU) of the embedded computing system. In an example implementation, the optimization unit 103 may be deployed and configured as a stand-alone processing unit in the embedded computing system. In other words, the optimization unit 103 may, for example, be considered as an intermediate framework connecting the one or more AI applications 101 running on the embedded computing system and various resources associated with the runtime environment 107 of the embedded computing system.

In an embodiment, the runtime environment 107 may correspond, for example, to a runtime state of the embedded computing system and may include libraries of various hardware resources 109 and software resources 111. As an example, the hardware resources 109 may include computing units and memory units. The software resources 111 may include various interfaces and applications required for operating the hardware resources 109. The runtime environment 107 may be responsible for implementing an execution model and/or executing a required application on the embedded computing system using selected hardware resources 109 and software resources 111. In other words, any AI application 101 in the embedded computing system must be loaded on to the runtime environment 107 before the AI application 101 may be run and/or used. For example, as soon as the AI application 101 is launched, all the resources, required for execution of the AI application 101, may be loaded to the runtime environment 107 for facilitating a proper execution and functioning of the AI application 101 on the embedded computing system.

In an embodiment, the optimization unit 103 may detect the launch of any AI application 101 in the embedded computing system. Further, the optimization unit 103 may retrieve a runtime profile 105 corresponding to the launched AI application 101 from a memory (not shown in FIG. 1) of the embedded computing system. The runtime profile 105 may be specific to each AI application 101 and may indicate the list and/or amount of resources required by the AI application 101 for a proper execution and functioning of the AI application 101 on the embedded computing system. In an embodiment, the runtime profile 105 for the AI application 101 may be created when an AI application 101 is being launched for the first time in the embedded computing system. A default runtime profile 105, created by a developer of the AI application 101, may be stored in the embedded computing system when the AI application 101 is installed on the embedded computing system.

In an embodiment, upon retrieving the runtime profile 105 of the AI application 101, the optimization unit 103 may configure the runtime environment 107 with the resources mentioned in the runtime profile 105 of the AI application 101. Thus, the optimization unit 103 configures and sets-up the runtime environment 107 according to the application-specific requirements mentioned in the runtime profile 105 of the AI application 101. This ensures that the runtime environment 107 is specific and accurate for the execution of the AI application 101, which in turn, ensures that the AI application 101 gets adequate and accurate runtime configurations for execution. Since only the required resources are loaded and allocated to the runtime environment 107, the optimization unit 103 also ensures optimal and/or efficient utilization of resources in the embedded computing system.

In addition, in a scenario where multiple AI applications 101 are launched/running in the embedded computing system, the optimization unit 103 may efficiently manage distribution of resources among the AI applications 101 based on the runtime profile 105 of each of the AI applications 101. Where the user tries to switch between multiple AI applications 101, the optimization unit 103 may dynamically setup the runtime environment 107 for each AI application 101 based on a current runtime status of the AI applications 101. The optimization unit 103 may eliminate and/or reduce redundant cycles of resource allocation/de-allocation process during the runtime of related AI applications 101, thereby ensuring optimal and/or efficient usage of power/battery resources in the embedded computing system.

Example benefits of using the optimization unit 103 include that the RAM occupancy may be improved in the mobile devices using the proposed optimization unit 103. By way of non-limiting example, it is observed that around 100 MB of the RAM occupancy has increased in various example mobile devices with the disclosed optimization unit 103, whenever one or more AI applications 101 were run on the mobile device. Additionally, the use of optimization unit 103 may drastically reduce the load time or the initialization time of the AI Applications 101 on the mobile devices. Table 1 below indicates a comparative analysis between the conventional mobile devices (e.g., without the optimization unit 103) and the mobile devices configured with the optimization unit 103.

TABLE 1

| AI application | Load time (in ms) | |
|---|---|---|
| | Conventional devices | Disclosed solution |
| AI Camera Classifier | 572.561 | 3.101 |
| AI Camera Detector | 290.817 | 1.854 |
| Human Model Instance | 152.13 | 2.294 |
| Human Model Live | 212.643 | 4.97 |

Similarly, it was observed that, with the use of the disclosed solution, the power consumption or the battery usage may be highly optimized and/or made much more efficient while running the AI applications 101. Table 2 summarized the reduction in the power consumption as stated above.

TABLE 2

| AI application | Power consumption (in mA) | |
|---|---|---|
| | Conventional devices | Proposed solution |
| Camera normal mode | 637.04 | 461.02 |
| Scene optimizer: ON | 967.15 | 693.508 |

TABLE 2-continued

| | Power consumption (in mA) | |
|---|---|---|
| AI application | Conventional devices | Proposed solution |
| Live focus | 839.78 | 839 |
| Selfie focus: Blur | 1327.9 | 755 |

The optimization unit 103 may reduce both the application initialization time and the power consumption in the mobile devices running one or more AI applications 101.

Figure 2:
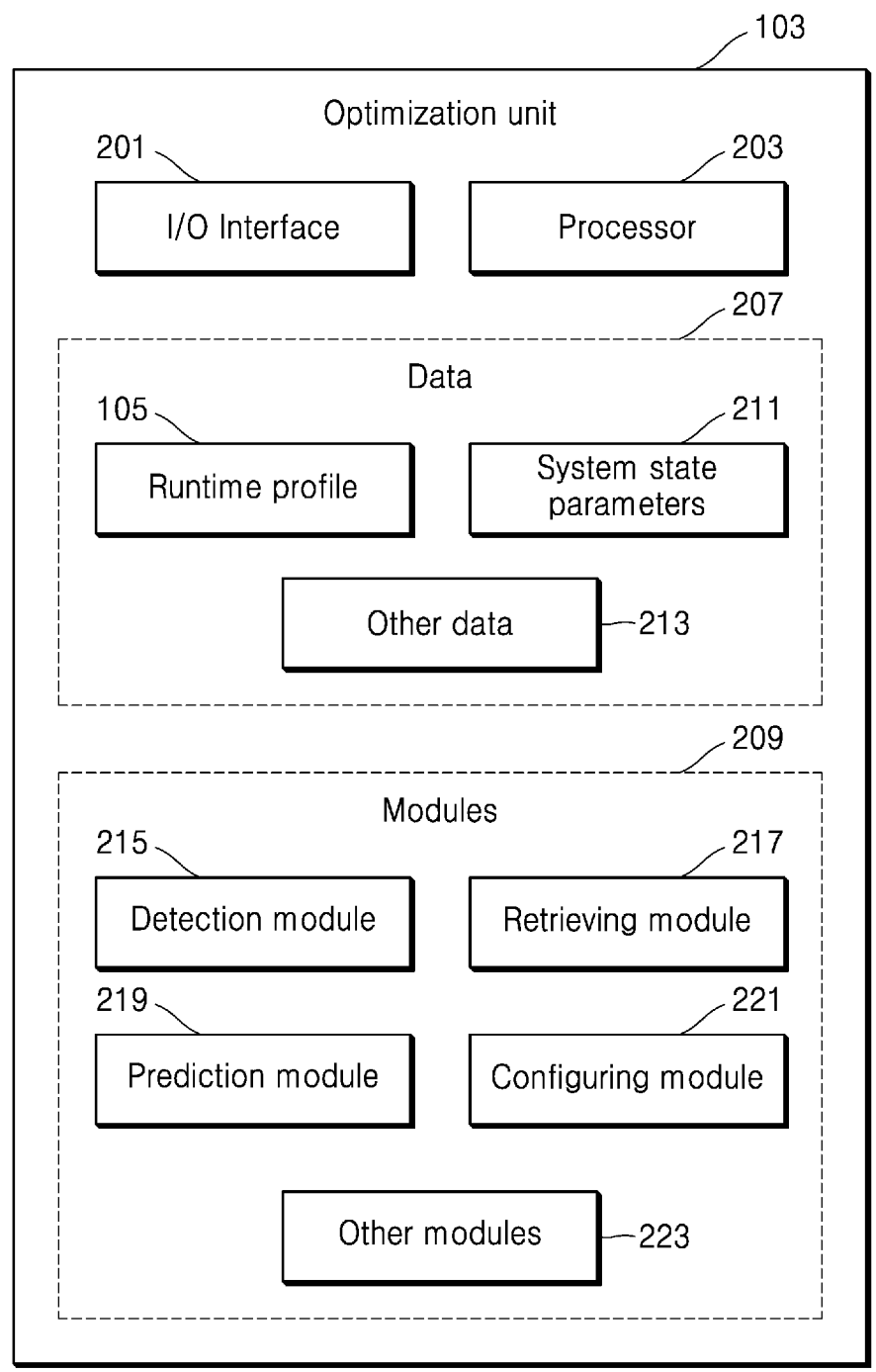
FIG. 2 is a block diagram illustrating an example configuration of an optimization unit according to various embodiments.

FIG. 2 is a block diagram illustrating an example configuration of an optimization unit 103 according to various embodiments.

In various embodiments, the optimization unit 103 may optionally include an I/O interface (e.g., including I/O circuitry) 201 and a processor (e.g., including processing circuitry) 203. The I/O interface 201 may include various I/O circuitry and enable the optimization unit 103 to interface with the memory and the runtime environment 107 of the embedded computing system. The processor 203 may include various processing circuitry and be used for analyzing runtime profiles 105 of AI applications 101 and for making intelligent decisions related to optimal and/or efficient utilization of resources of the embedded computing system, using the data 207 and one or more modules (e.g., including various processing circuitry and/or executable program instructions) 209. In an embodiment, the processor 203 may, for example, be a part of Central Processing Unit (CPU) of the embedded computing system. In an embodiment, the processor 203 may be a stand-alone computing unit, different from the CPU of the embedded computing system.

In an embodiment, the data 207 associated with the optimization unit 103 may include, without limitation, the runtime profile 105 of the AI applications 101, system state parameters 211 relating to the runtime environment 107, and other data 213, etc. In various embodiments, the data 207 may be stored within the memory of the embedded computing system in the form of various data structures. The data 207 may be organized using data models, such as, for example, relational or hierarchical data models, or the like. The other data 213 may include, for example, various temporary data and files generated by the optimization unit 103.

In an embodiment, the runtime profile 105 of the AI application 101 may indicate the resource requirements for executing the AI application 101 in the runtime environment 107 of the embedded computing system. In an embodiment, the runtime profile 105 for the AI application 101 may be created based on one or more system state parameters 211 related to the AI application 101.

In an embodiment, the one or more system state parameters 211 may include, without limitation, at least one of expected power consumption by the AI application 101, a performance mode of the AI application 101, and an assessment of Random Access Memory (RAM) availability in the embedded computing system, etc. As an example, the performance mode may include a high-level performance mode or a low-level, conservative performance mode. In an embodiment, values of each of the one or more system state parameters 211 may be continuously monitored during execution of the AI application 101. Further, the runtime profile 105 of the AI application 101 may be dynamically updated when a deviation in the values of the one or more system state parameters 211 is observed during the runtime of the AI application 101. At the end of each execution cycle, the runtime profile 105 of the AI application 101 may be updated based on performance of the AI application 101 in the previous execution cycle.

In an embodiment, the data 207 may be processed by the one or more modules 209. In some implementations, the one or more modules 209 may be communicatively coupled to the processor 203 for performing one or more functions of the optimization unit 103. In an embodiment, the one or more modules 209 may include, without limitation, a detection module (e.g., including various processing circuitry and/or executable program instructions) 215, a retrieving module (e.g., including various processing circuitry and/or executable program instructions) 217, a prediction module (e.g., including various processing circuitry and/or executable program instructions) 219, a configuring module (e.g., including various processing circuitry and/or executable program instructions) 221, and other modules (e.g., including various processing circuitry and/or executable program instructions) 223.

As used herein, the term 'module' may refer, for example, to an Application Specific Integrated Circuit (ASIC), an electronic circuit, a processor (shared, dedicated, or group) and memory that execute one or more software or firmware programs, a combinational logic circuit, and/or other suitable components that provide the described functionality (also referred to herein as "various processing circuitry and/or executable program instructions"). In an embodiment, the other modules 223 may be used to perform various miscellaneous functionalities of the model generation system 105. It will be appreciated that such one or more modules 209 may be represented as a single module or a combination of different modules.

In an embodiment, the detection module 215 may be configured for detecting the launch of an AI application 101 in the embedded computing system.

In an embodiment, the retrieving module 217 may be configured for retrieving a runtime profile 105 corresponding to the launched AI application 101 from a memory associated with the embedded computing system.

In an embodiment, the prediction module 219 may be configured for predicting one or more AI applications 101 which may be launched and/or executed subsequent to an AI application 101 currently being executed in the runtime environment 107. For example, when a camera AI application 101 is running on the runtime environment 107, the prediction module 219 may predict the one or more other AI applications 101 which may be executed concurrently and/or subsequent to the camera AI application 101. For example, based on historical usage pattern and user preferences, the prediction module 219 may predict that a scene recognition AI application 101 may be launched along with the camera AI application 101. In such an example, the optimization unit 103 may proactively retrieve the runtime profile 105 corresponding to the scene recognition AI application 101 and prepare to set-up the runtime environment 107 for executing the scene recognition AI application 101. This in turn may ensure smooth transition between the AI applications 101 and enhances user experience with the embedded computing system.

In an embodiment, the configuration module may be used for configuring the runtime environment 107 with the resources required by the AI applications 101 launched in the embedded computing system. The configuration of the runtime environment 107 is described in greater detail below with reference to example flowcharts.

FIG. 3A is a flowchart illustrating an example method 300A of creating and updating runtime profile 105 for an AI application 101 according to various embodiments.

At operation 301, the optimization unit 103 may detect the launch of an AI application 101 in the embedded computing system. Further, at operation 303, the optimization unit 103 may determine whether a pre-stored runtime profile 105 corresponding to the launched AI applications 101 exists in the memory of the embedded computing system.

In an embodiment, if the pre-stored runtime profile 105 exists ("Yes" in operation 303), at operation 305, the optimization unit 103 may compare the current runtime profile 105 of the AI application 101 with the pre-stored runtime profile 105 to determine the similarity between the two runtime profiles 105. Further, at operation 307, based on the comparison, the optimization unit 103 determines if there is a match between the pre-stored runtime profile 105 and the current runtime profile 105.

In an embodiment, if a match is determined ("Yes" in operation 307), the optimization unit 103 may return the retrieved runtime profile 105 for configuring the runtime environment 107, as shown in block 311. If the pre-stored runtime profile 105 does not match the current runtime profile 105 ("No" in operation 307), the optimization unit 103 may update the runtime profile 105 at operation 309, before sending the same for configuring the runtime environment 107 at operation 311.

On the other hand, if there is no pre-stored runtime profile 105 for the AI application 101 ("No" in operation 303), the optimization unit 103 may dynamically create the runtime profile 105 for the AI application 101 based on current values of system state parameters 211, as indicated in operation 313.

In an embodiment, the pre-stored profile of the AI application 101 may be used as such for configuring the runtime environment 107 when there is at least 80%-90% match between the pre-stored runtime profile 105 and the current runtime profile 105. In other words, the pre-stored runtime profile 105 may be updated when the current runtime profile 105 deviates from the pre-stored runtime profile 105 by, for example, more than a 20% similarity.

Figure 3B:
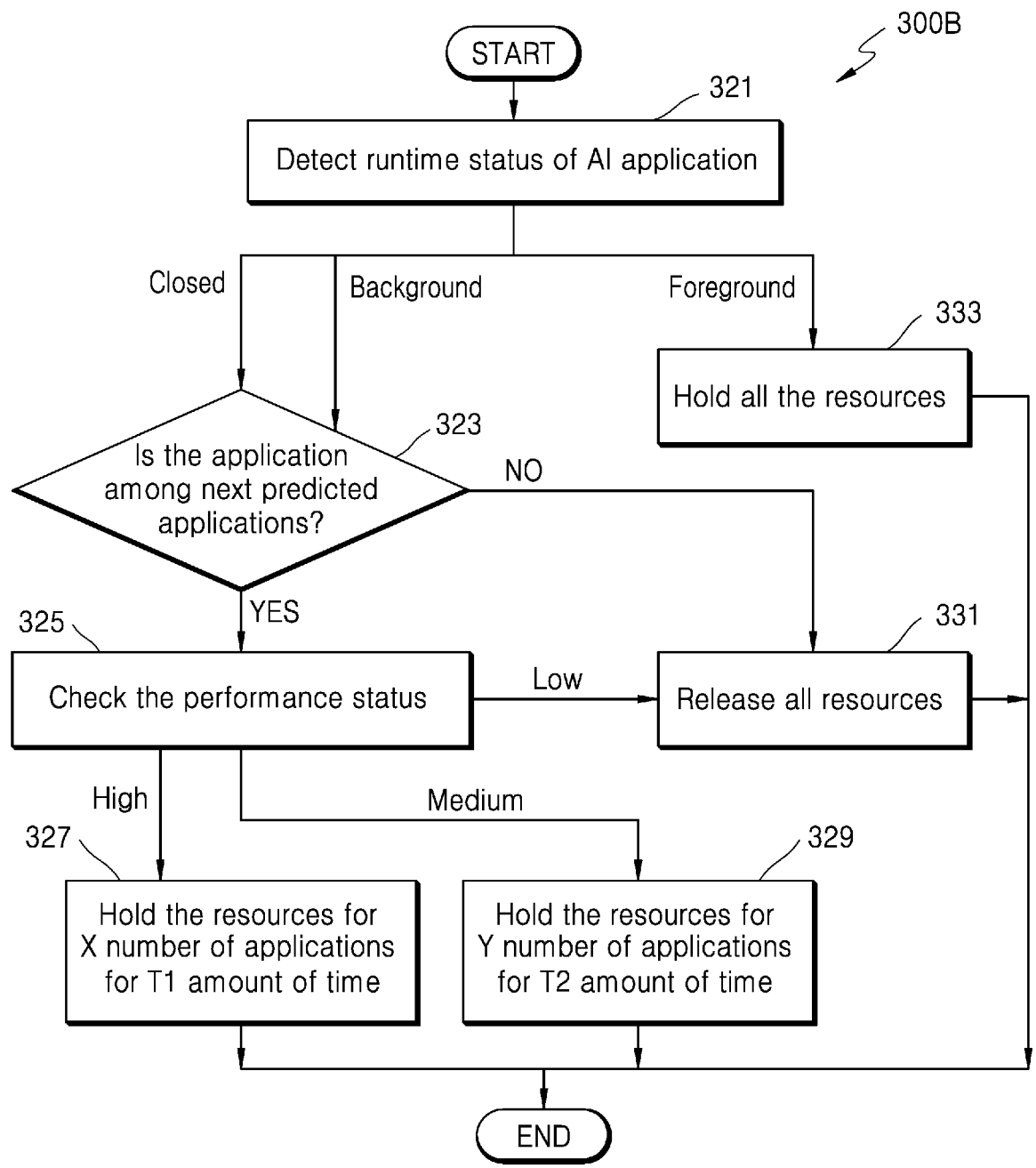
FIG. 3B is a flowchart illustrating an example method of managing resources in the runtime of an AI application according to various embodiments.

FIG. 3B is a flowchart illustrating an example method 300B of managing resources during the runtime of an AI application 101 according to various embodiments.

At operation 321, the optimization unit 103 detects a runtime status of the AI application 101. As an example, the runtime status of the AI application 101 may be at least one of closed, background instance and foreground instance.

In an embodiment, when the runtime status is detected as 'closed' or 'background instance', the optimization unit 103 checks, at operation 323, whether the AI application 101 is in the list of next predicted AI applications 101.

If the application is found in the list of next predicted applications ("Yes" at operation 323), at operation 325, the optimization unit 103 may further check a performance status of the application. As an example, the performance status may be one of 'High', 'Medium' and 'Low'. In an embodiment, the performance status of the AI application 101 may be designated based, for example, and without limitation, on parameters such as criticality/importance of the AI application 101, usage frequency of the AI application 101 and the like.

In an embodiment, the performance status of the AI applications 101 may be predefined as 'Critical', 'Persistent' and 'Low'. Along with this, parameters like a performance mode chosen by the user, battery percentage, temperature of the device may be used to categorize the AI applications 101 for resource utilization as 'High', 'Medium' or 'Low'. As an example, a 'critical' AI application 101 that is launched when the device is in a performance mode with abundant battery percentage (say more than 80% of battery) and a normal temperature of 30 degrees, the AI application 101 may be categorized under 'High' performance mode.

In an embodiment, if the performance status is 'High', it may be considered that the AI application 101 is a high priority or a critical application. Accordingly, the optimization unit 103 may hold all the resources allocated for a 'X' number of 'High' performance AI applications 101 for a time period 'T1', as shown in operation 327. Similarly, if the performance status of the application is 'Medium', the optimization unit 103, at operation 329, may hold the resources of 'Y' number of applications for a timer period 'T2'. In an embodiment, the time period 'T1' may be more than the time period 'T2', which may refer, for example, to the resources for the AI applications 101 having 'High' performance status being held in the runtime environment 107 for a longer period of time than the resources of the AI applications 101 having 'Medium' performance status. Further, if the performance status of the AI applications 101 is determined to be 'Low', the optimization unit 103 may release all the resources previously allocated to the AI application 101 from the runtime environment 107, as indicated in operation 331.

In an embodiment, even when the AI application 101 is not present in the list of next predicted applications ("No" in operation 323), the optimization unit 103 may release all the resources allocated to the AI application 101, as indicated in operation 331. In an embodiment, the time period for which the resources may be allocated and held for the AI application 101 may be determined based on the performance status of the AI application 101.

In an embodiment, when the AI application 101 is detected to be in the 'Foreground' instance, the optimization unit 103 may hold and maintains all the resources required by the AI application 101 in the runtime environment 107, as indicated in operation 333. This ensures that the resources in the embedded computing system are optimally shared among the AI applications 101 based on the specific requirement of each AI application 101.

Figure 4:
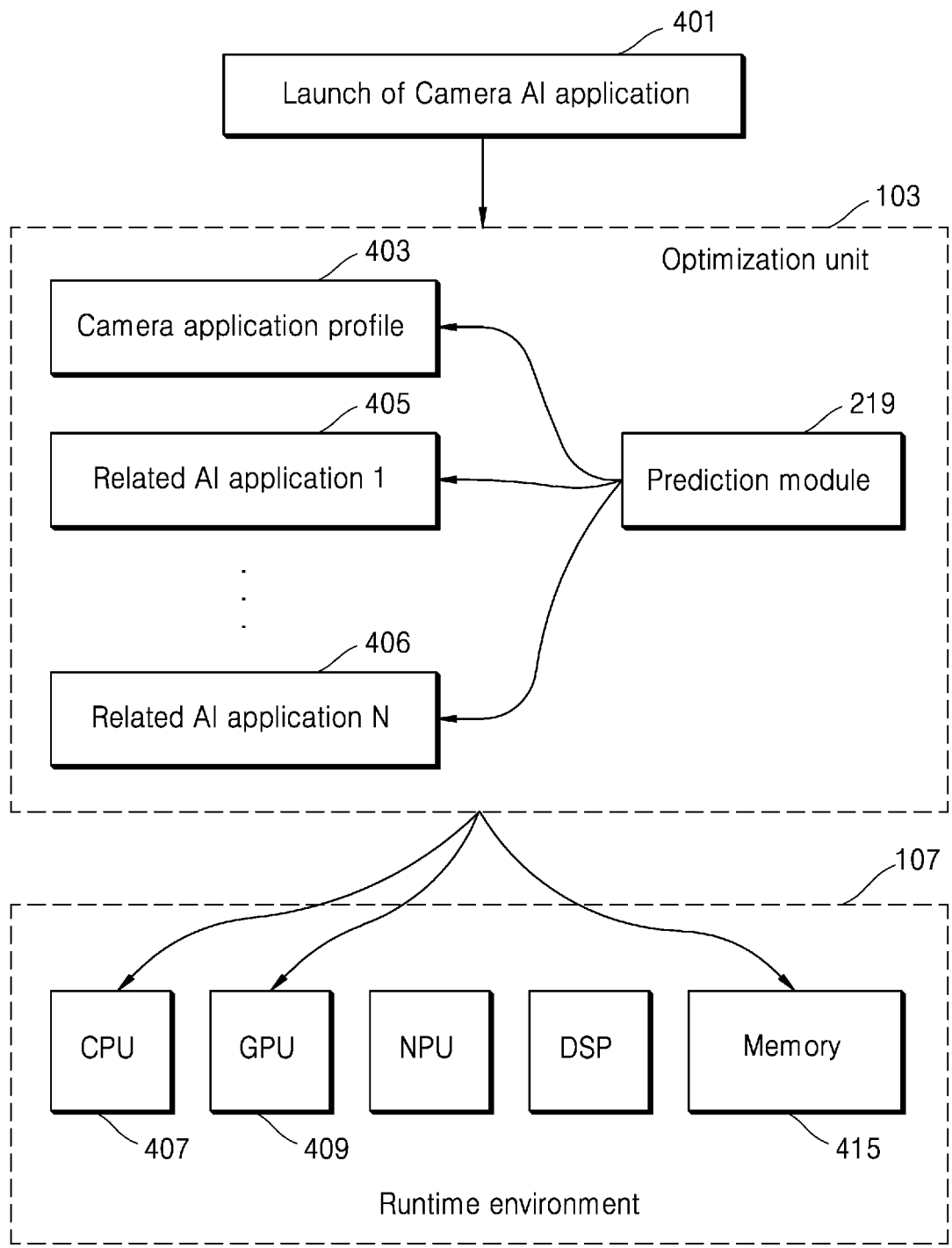
FIG. 4 is a diagram illustrating an example method of optimizing resource utilization in an embedded computing system according to various embodiments.

FIG. 4 is a diagram illustrating an example method of optimizing resource utilization in an embedded computing system according to various embodiments.

FIG. 4 illustrates optimal and/or efficient resource utilization with respect to a camera AI application running on the embedded computing system. Once the launch of the camera AI application is detected at operation 401, the optimization unit 103 may retrieve the runtime profiles 403 of the camera AI application and one or more related AI applications 405 to 406 (collectively referred as an related AI application 405 or related AI applications 405), which are related to the camera AI application, from, for example, a static memory 415 associated with the embedded computing system. As an example, the AI applications related to the camera AI application may include for example, and without limitation, a scene recognition AI application, an object detection AI application, a depth-effect AI application and the like. In an embodiment, the one or more related AI applications 405 of the camera AI application may be determined using the prediction module 219, based on historical usage preferences of the user.

In an embodiment, once the runtime profiles 105 corresponding to each AI application has been retrieved, the optimization unit 103 may configure the runtime environment 107 with the resources indicated in the runtime profile 403 of the camera AI application and the related AI applications 405 and allocate them to the respective AI applications. For example, the AI camera application may require the memory 415 and the CPU 407 resources and the same may be configured in the runtime environment 107. For example, if the scene recognition AI application requires an additional GPU 409 to process an image, then the GPU 409 may be dynamically configured in the runtime environment 107 for execution by the scene recognition AI application. Similarly, the optimization unit 103 may recognize additional resources required by other related AI applications 405 from the runtime profiles 105 of the related AI applications 405 and may dynamically configure the recognized resources on the runtime environment 107. This ensures that each of the AI application running on the embedded computing system gets accurate and adequate resources for execution.

In an embodiment, in cases where the resource requirements specified in the runtime profile 403 of the camera AI application are not available with the runtime environment 107 of the mobile device and/or when the mobile device does not have adequate resources to be assigned to the camera AI application, the optimization unit 103 may load a low-level runtime profile to the runtime environment 107. The above scenario is summarized in the following pseudo-code, considering the resource requirements in terms of battery level and RAM availability of the mobile device.

if the battery is greater than threshold, and available RAM is greater than threshold,
    then, preload the Machine Learning (ML) models of all camera 'Modes' in the memory
    prepare computing units before-hand to avoid redundant 'wakeup' and 'shutdown' calls,
    hold resources until lifecycle of the application
else
    load a default low resource profile for the camera AI application.

Using a low-level runtime profile for executing the camera AI application ensures that the resources, which are already allocated to other 'High' profile AI applications 101 are not released abruptly. This in turn ensures eliminates redundant resource 'wakeup' and 'shutdown' system calls while the one or more AI applications 101 are running on the mobile device.

Figure 5:
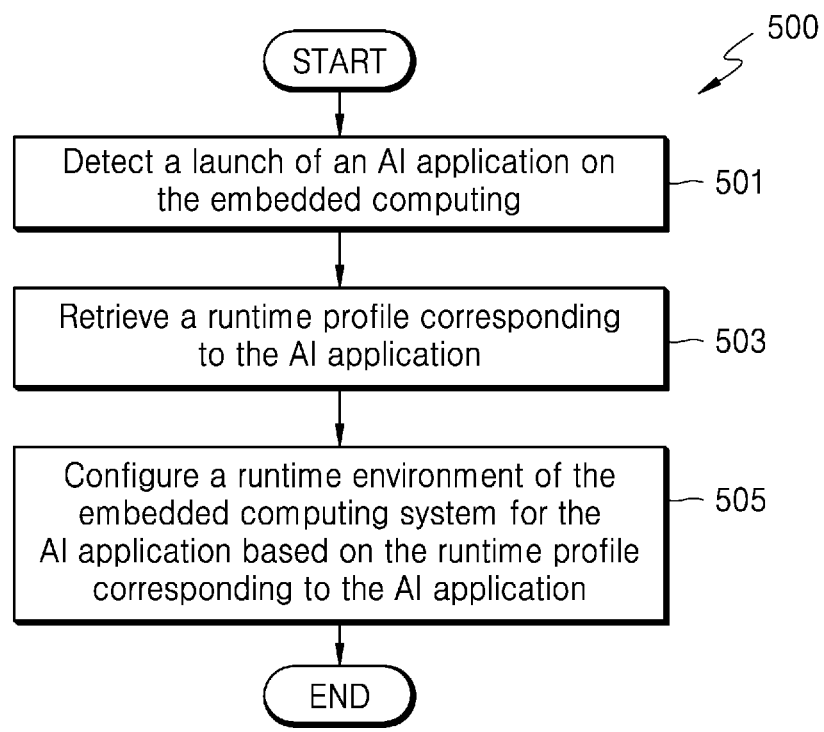
FIG. 5 is a flowchart illustrating an example method of optimizing resource utilization in an embedded computing system according to various embodiments.

FIG. 5 is a flowchart illustrating an example method of optimizing resource utilization in an embedded computing system according to various embodiments.

As illustrated in FIG. 5, the method 500 may include one or more operations illustrating an example method of optimizing resource utilization in an embedded computing system using the optimization unit 103 shown in FIG. 1. The method 500 may be described in the general context of computer executable instructions. Generally, computer executable instructions may include, for example, and without limitation, routines, programs, objects, components, data structures, procedures, modules, and functions, or the like, which perform specific functions or implement specific abstract data types.

The order in which the method 500 is described is not intended to be construed as a limitation, and any number of the described operations can be combined in any order to implement the method. Additionally, individual operations may be deleted from the methods without departing from the spirit and scope of the subject matter described herein. Furthermore, the method can be implemented in any suitable hardware, software, firmware, or combination thereof.

At operation 501, the method 500 includes detecting, by the optimization unit 103, a launch of an AI application 101 on the embedded computing system. As an example, the AI application 101 may be an AI camera application installed on a mobile device. The launch of the AI application may be detected when a user of the mobile device has initiated the use of the AI application 101.

At operation 503, the method 500 includes retrieving, by the optimization unit 103, a runtime profile 105 corresponding to the AI application 101. The runtime profile 105 may indicate resource requirements for executing the AI application 101. Further, the runtime profile 105 for the AI application 101 may be created based on one or more system state parameters 211 related to the AI application 101. As an example, the one or more system state parameters 211 may include, without limitation, at least one of power consumption, performance mode of the AI application 101 and assessment of Random-Access Memory (RAM) availability in the embedded computing system.

In an embodiment, the runtime profile 105 of the AI application 101 may be dynamically updated based on deviation in the one or more system state parameters 211 determined during the runtime of the AI application 101. Further, a pre-stored runtime profile 105 of the AI application 101 may be updated based on real-time usage of the AI application 101 on the embedded computing system.

At operation 505, the method 500 includes configuring, by the optimization unit 103, a runtime environment 107 of the embedded computing system for the AI application 101 based on the runtime profile 105 corresponding to the AI application 101. In an embodiment, configuring the runtime environment 107 for the AI application 101 may include pre-loading the one or more resources required for executing the AI application 101 on the runtime environment 107 of the embedded computing system. As an example, one or more resources required for executing the plurality of related AI applications 405 may be loaded and maintained in the runtime environment 107, until completion of execution of each of the plurality of related AI applications 405, for eliminating redundant resource initiation and resource evacuation cycles.

In an embodiment, the plurality of related AI applications 405 may include AI applications 101 executing concurrently in the runtime environment 107 and one or more AI applications 101 predicted to be executed subsequent to the AI application 101 being executed on the runtime environment 107. In an embodiment, the optimization unit 103 may track the runtime environment 107 for determining a runtime status of the AI application 101. As an example, the runtime status may be at least one of a foreground instance and a background instance.

In an embodiment, each of the one or more resources already assigned to the AI application 101 may be held/retained in the runtime environment 107 when the runtime status is determined to be the foreground instance. The one or more resources may be retained only for a predefined time period, when the runtime status is determined as the background instance, but the AI application 101 is present in a list of applications predicted to be launched again. Each of the one or more resources already assigned to the AI application 101 may be released from the runtime environment 107 when the runtime status is determined as the background instance and the AI application 101 is not present in the list of applications predicted to be launched again.

For example, the optimization unit 103 may make intelligent decisions as to whether a set of resources, already assigned to the AI application 101, shall be retained in the runtime environment 107 or released back to the resource pool of the embedded computing system. With this, the optimization unit 103 may optimize the resource utilization in the embedded computing system.

In an embodiment, one or more non-transitory computer-readable storage media may be utilized in implementing embodiments consistent with the disclosure. A non-transitory computer-readable storage medium refers to any type of physical memory on which information or data readable by a processor may be stored. Thus, a non-transitory computer-readable storage medium may store instructions for execution by one or more processors, including instructions for causing the processor(s) to perform steps or stages consistent with the embodiments described herein. The "non-transitory computer-readable medium" should be understood to include tangible items and exclude carrier waves and transient signals, e.g., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", "various embodiments" and "one embodiment" may refer, for example, to "one or more (but not all) embodiments of the disclosure" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. For example, a variety of optional components are described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method of improving efficiency of resource utilization in an embedded computing system executing Artificial Intelligence (AI) applications, the method comprising:

detecting launch of an AI application;

retrieving, by an optimization unit comprising processing circuitry and/or executable program instructions configured in the embedded computing system, runtime profiles corresponding to the AI application and one or more related AI applications, wherein the one or more related AI applications are related to the AI application based on historical usage preferences, wherein the runtime profiles indicates resource requirements for executing the AI application and the one or more related AI applications, wherein the runtime profiles for the AI application and the one or more related AI applications are based on one or more system state parameters-related to the AI application, wherein the one or more system state parameters include at least one of power consumption, performance mode chosen by a user of the AI application, or assessment of Random Access Memory (RAM) availability in the embedded computing system;

determining, by the optimization unit, whether the retrieved runtime profiles match current runtime profiles for the AI application and the one or more related AI applications;

based on a match being determined, configuring, by the optimization unit, a runtime environment of the embedded computing system by allocating resources for executing the AI application and the one or more related the AI applications based on the retrieved runtime profiles;

identifying, by an optimization unit, a runtime status of the AI application, wherein the runtime status includes at least one of a foreground instance, a background instance, or closed;

based on the runtime status of the AI application being the background instance or closed, detecting, by the optimization unit, that the AI application is predicted to be launched;

identifying, by the optimization unit, a performance status of the AI application, wherein the performance status is categorized according to resource usage levels; and holding or releasing resources for the AI application according to the identified the performance status.

2. The method of claim 1, wherein the retrieved runtime profiles are updated based on real-time usage of the AI application on the embedded computing system.

3. The method of claim 1, wherein one or more resources required for executing the one or more related AI applications are loaded and maintained in the runtime environment, until completion of execution of the one or more related AI applications.

4. The method of claim 3, wherein the one or more related AI applications includes AI applications executing concurrently in the runtime environment and one or more AI applications predicted to be executed subsequent to the AI application being executed on the runtime environment.

5. The method of claim 1, wherein a predefined time period for holding the one or more resources is determined based on a performance status of the AI application.

6. The method of claim 1, wherein a low-level runtime profile of the AI application is configured on the runtime environment based on the embedded computing system having a constrained resource availability.

7. An optimization unit configured to improve efficiency of resource utilization in an embedded computing system executing Artificial Intelligence (AI) applications, the optimization unit comprising:

a processor comprising processing circuitry; and a memory, communicatively coupled to the processor, wherein the memory stores processor-executable instructions, which on execution, cause the processor to:

detect launch of an AI application;

retrieve runtime profiles corresponding to the AI application and one or more related AI applications, wherein the one or more related AI applications are related to the AI application based on historical usage preferences, wherein the runtime profiles indicates resource requirements for executing the AI application and the one or more related AI applications, wherein the runtime profiles for the AI application and the one or more related the AI applications are based on one or more system state parameters, wherein the one or more system state parameters include at least one of power consumption, performance mode chosen by a user of the AI application, or assessment of Random Access Memory (RAM) availability in the embedded computing system;

determine whether the retrieved the runtime profiles match current runtime profiles for the AI application and the one or more related AI applications;

based on a match being determined, configure a runtime environment of the embedded computing system by allocating resources for executing the AI application and the one or more related the AI applications based on the retrieved runtime profiles;

identify a runtime status of the AI application, wherein the runtime status includes at least one of a foreground instance, a background instance, or closed;

based on the runtime status of the AI application being the background instance or closed, detect that the AI application is predicted to be launched;

identify a performance status of the AI application, wherein the performance status is categorized according to resource usage levels; and hold or release resources for the AI application according to the identified the performance status.

8. The optimization unit of claim 7, wherein the retrieved runtime profiles are updated based on real-time usage of the AI application on the embedded computing system.

9. The optimization unit of claim 7, wherein one or more resources required for executing of the one or more related AI applications are loaded and maintained in the runtime environment, until completion of execution of the one or more related AI applications.

10. The optimization unit of claim 7, wherein a predefined time period for holding the one or more resources is determined based on a performance status of the AI application.

11. The optimization unit of claim 7, wherein a low-level runtime profile of the AI application is configured on the runtime environment based on the embedded computing system having a constrained resource availability.

* * * * *